United States Patent Office 3,377,318
Patented Apr. 9, 1968

3,377,318
PREPARATION OF FORMALDEHYDE-DIKE-
TENE COPOLYMERS WITH ORGANIC NI-
TROGEN COMPOUNDS AS CATALYST
Kornel D. Kiss, University Heights, Ohio, assignor to
Diamond Shamrock Corporation, a corporation of
Delaware
No Drawing. Filed May 25, 1964, Ser. No. 370,076
6 Claims. (Cl. 260—73)

ABSTRACT OF THE DISCLOSURE

Thermally stable thermoplastic copolymers are prepared by reacting a major amount of formaldehyde and a minor amount of diketene under substantially anhydrous conditions and in the presence of an organic nitrogen compound as catalyst. Specific organic nitrogen compounds employed are triethylamine, dipropylamine, tributylamine and pyridine.

This invention relates to novel thermoplastic compositions of matter. More particularly, it relates to oxymethylene copolymers having a high degree of thermal stability and to the process for preparing these compositions.

It is now well known in the art to prepare oxymethylene homopolymers by polymerizing formaldehyde in the presence of suitable polymerization initiators, preferably under substantially anhydrous conditions, or by similarly polymerizing trioxane or other oligomers of formaldehyde. These polymers which are composed of recurring oxymethylene —$CH_2O$— units joined together in linear chains may vary widely in molecular weight and thermal stability, depending upon the manner of preparation. Polyoxymethylenes of higher average molecular weight are known to be more stable against thermal degradation than those of lower molecular weight. However, even these higher molecular weight homopolymers may be degraded to varying degrees when exposed to elevated temperatures encountered during processing, and thus are usually stabilized prior to processing by chemical treatment and/or by incorporating stabilizing additives therewith.

We have now found that easily processable polymeric compositions which are structurally related to polyoxymethylene and possess similar toughness and strength properties may be prepared by reacting either formaldehyde or trioxane with diketene, $C_4H_4O_2$, which is believed to have the cyclic structure

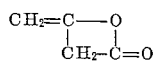

More specifically, the present invention involves the preparation of useful, easily workable oxymethylene copolymer compositions of high thermal stability by copolymerizing, under substantially anhydrous conditions and in the presence of suitable polymerization catalysts or initiators, a mixture containing from 80 to 99.9 mol percent of either formaldehyde or trioxane in combination with from 0.1 up to 20 mol percent of diketene, the said process being conducted at a temperature within the range of −80° C. to +90° C.

The copolymer products obtained are medium to high molecular weight materials which exhibit an improved resistance to thermal degradation by comparison to oxymethylene homopolymers similarly prepared and processed. In general, these products may be fabricated into finished plastic articles using presently practiced, conventional processing equipment and techniques.

While we do not wish to be bound by any definite theory regarding the manner in which copolymerization is accomplished, it is believed that in the reaction, the ring structure of diketene opens similar to the ring opening which occurs in the homopolymerization of this monomer. In the copolymer product, the linear diketene units resulting are interspersed between recurring oxymethylene units, the units derived from the diketene having the polyester structure I 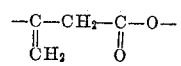

It is to be noted that, as expected, diketene may be substantially incorporated into the copolymer chain as described, since absorption bands characteristic for both the C=C group and for the carbonyl (C=O) group are present in qualitative infrared spectra of many of the copolymer products.

However, it is also probable that in contact with certain catalysts employed herein, at least some of the linear units produced by the ring opening of the diketene monomer and interspersed between recurring oxymethylene units in the copolymer product, may have the following polyketone structure II 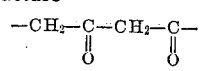

Additionally, it is possible that, depending upon the method of preparation, the copolymers of this invention may also contain interspersed between recurring oxymethylene units, some units derived from diketene which have the structure III 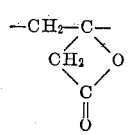

In the copolymer chain the units derived from diketene, as described above, may be interspersed singly between recurring oxymethylene units and may likewise be present therein as comonomer blocks, i.e., segments of the chain comprising at least two of any one or of all of the units represented by the foregoing structures I, II and III which are sequentially joined together with no oxymethylene units between them.

Depending upon the percentage of diketene present in the copolymer products of this invention, these materials have melting points substantially lower or only slightly lower than that of oxymethylene homopolymers, i.e., these copolymers have melting points usually within the range of about 145° to 180° C., whereas similarly prepared homopolymers have melting points of 185° to 186° C. Likewise, by varying the method for their preparation, copolymers of widely different characteristics can be obtained. The finished articles fabricated from these products may vary from elastic, somewhat rubbery materials to those of an extremely tough, rigid character. In appearance, the copolymers resemble, in most instances, polyoxymethylene and those having melting points similar to polyoxymethylene likewise exhibit substantially similar physical properties.

The copolymer products may contain generally from about 0.1 up to 20 mol percent of units derived from diketene, i.e., in the copolymer chain there may be from about 0.1 up to 20 percent of recurring units derived from diketene interspersed with from about 80 up to 99.9 percent of recurring oxymethylene units. The preferred copolymers of this invention contain from about 0.1 up to 10 percent of the said recurring units derived from diketene and from about 90 up to 99.9 percent of recurring oxymethylene units.

The copolymerization reaction is effected in the presence of an ionic-type polymerization catalyst. Suitable catalysts of this type include Lewis acids, e.g., metal halides such as the halides of aluminum, boron, titanium, zirconium, strontium, niobium and the like; organometallic compounds such as butyl lithium, diethyl zinc, diethyl aluminum, tributyl boron, phenyl magnesium bromide, methyl aluminum dichloride and the like; coordinate complexes of metal halides, e.g., boron trifluoride, with one or more organic compounds in which oxygen, nitrogen or sulfur is the donor atom; and organic nitrogen compounds such as triethylamine, dipropylamine, tributylamine, pyridine and the like. The metal halide catalysts, their coordinate complexes, or such coordinate complexes in combination with organic nitrogen compounds are preferably employed when preparing copolymers from trioxane. These catalysts may be employed alone, or may be applied as solutions or suspensions in suitable organic solvents or liquids. In general, the particular catalyst employed in the process of this invention may be used in an amount ranging from 0.01 up to about 25 millimols for each liter of organic liquid reaction medium employed. However, an amount of catalyst within the range of about 0.1 to 10 millimols per liter of reaction medium generally has been found satisfactory and is preferred.

Although it is possible to conduct the copolymerization reaction in the absence of a solvent, i.e., by a bulk copolymerization, the reaction is preferably conducted in an inert anhydrous organic liquid which is a solvent for the monomers and for the catalyst and which is a liquid at the reaction temperature. Suitable solvents include aliphatic, cycloaliphatic and aromatic hydrocarbons or their halogenated and nitrated derivatives. Especially preferred for use are aliphatic and aromatic hydrocarbons containing from 3 to 12 carbon atoms per molecule, e.g., n-heptane or toluene; halogenated aliphatic hydrocarbons such as methylene chloride; and nitrated aromatic hydrocarbons such as nitrobenzene. Typically, a ratio of from 3 to 10 parts solvent for each part of formaldehyde or trioxane is employed in the reaction.

It is essential that the copolymerization process be conducted under anhydrous or substantially anhydrous conditions. Accordingly, a catalyst solution or suspension employed is prepared and then kept prior to use in a nitrogen atmosphere, the liquid reaction medium is dried prior to use and the entire process is carried out under nitrogen.

In carrying out the reaction, temperatures ranging from —80° to +90° C. and reaction times of from 1 hour to 10 hours generally may be employed. When preparing copolymers from trioxane, however, temperatures ranging from 20° to 70° C. are typically employed. Reaction temperatures ranging from —70° to +80° C. are more suitably employed when preparing copolymers from formaldehyde. In general, reaction times are typically from 1 to 6 hours.

Upon completion of the reaction, the polymerization mixture is filtered to recover the product precipitate. Prior to being dried, the product may then be purified by leaching it well with methanol, acetone, etc., to remove any unreacted monomers and catalyst residues remaining or to remove any low molecular weight diketene homopolymers which may be present. Additionally, the finished copolymer product may be heated briefly at a temperature of 100° to 130° C. to decompose any loose, unstable chain ends.

As stated earlier, the copolymers of this invention possess, in most instances, a high degree of thermal stability, and thus may be processed as prepared without any further stabilizing treatment such as by chain endgroup "capping," i.e., by chemically converting the unstable hydroxyl groups terminating the polymer chains to more stable ether or ester groups, and/or by incorporating stabilizing additives with the copolymers in processing. However, it is to be understood that the copolymers may be so stabilized, if desired, without departing from the intended scope of this invention.

Shaped thermoplastic articles such as moldings, films, sheets, rods, tubes, fibers, filaments and the like generally may be prepared from the copolymer products by conventional molding, casting and/or extrusion processes presently practiced. These articles exhibit generally the excellent physical and chemical properties which are typical of articles fabricated from oxymethylene homopolymers. In processing, the copolymers may be used unmodified or, if desired, may have incorporated therewith additives such as antioxidants, fillers, pigments, stabilizers, processing aids and the like which are oftentimes employed when processing thermoplastic materials.

In order that those skilled in the art may more completely understand the present invention and the preferred methods by which the same may be carried into effect, the following specific examples are offered.

Example 1

A one-liter, four-necked polymerization flask is fitted with an agitator, a thermometer, a reflux condenser, a rubber serum cap for catalyst injection and with inlet and outlet tubes for passage of nitrogen. An electrically-heated flask used as a pyrolyzer to supply formaldehyde monomer to the polymerizer is fitted with a thermometer and with gas inlet and outlet tubes, and is connected by cold traps to the polymerization flask. At room temperature, 100 g. of trioxymethylene (reagent grade) is placed in the pyrolyzer, 500 ml. of anhydrous n-heptane is charged to the polymerization flask and agitation is started. The polymeriization system is then sealed and purged with nitrogen, after which 20 ml. of diketene is injected into the polymerizer, followed by 0.32 ml. of pyridine, and formaldehyde vapors are introduced into the polymerizer. The reaction is then continued for 1½ hours, gradually warming during this time period to a temperature of 50° C. Three separate 1-ml. portions of diketene are then added to the polymerization mixture at 30-minute intervals, after which the mixture is gently heated to 55° C. and maintained at this temperature for 1½ hours. After the addition of catalyst, the total reaction time is 4 hours. The reaction mixture is cooled, discharged from the polymerizer and filtered to separate the product precipitate. The isolated product is thoroughly extracted with acetone and is then dried at 50° C. under vacuum. There is recovered 35 g. of a white polymeric material which has a melting point of 140° C. Portions of this product are molded for 1 minute at 180° C. under a pressure of 4000 p.s.i. The opaque specimen moldings obtained are extremely tough and rigid moldings which are off-white in color.

Example 2

Following the general procedure as outlined in Example 1, a formaldehyde-diketene copolymer is prepared. The same ingredients are employed in the same proportions as in Example 1 with the exception that, in this example, 0.16 millimol of $AlCl_3$ per liter of reaction medium is employed as the catalyst in place of the pyridine. After addition of the catalyst, the reaction time in this example is 4½ hours, during which time period the temperature of the reaction mixture is gradually raised by external heat from an initial temperature of 26° C. to a maximum temperature of 80° C. The product is isolated and purified as described in Example 1. The polymeric material recovered (24 g.) melts at 163° C. It is molded as described in Example 1 to prepare specimen moldings similar in color, capacity, toughness and rigidity to the molded products of Example 1.

Example 3

A formaldehyde-diketene copolymer is prepared following the general procedure as outlined in Example 1, employing 100 g. of trioxymethylene, 500 ml. of n-heptane, 23 ml. of diketene and 0.32 ml. of triethylamine as catalyst. After addition of the catalyst, the reaction is continued for 4½ hours. During this time period, the temperature of the reaction mixture, which initially is 23° C., gradually warms in 2 hours to 37° C., and is then warmed further by external heat to a maximum temperature of 80° C. The product is isolated and purified as described in Example 1. There is recovered 37.5 g. of a polymeric material which melts at 140° C. It is molded for 1 minute at 145° under a pressure of 4000 p.s.i. The specimen moldings obtained are white and opaque in appearance, and exhibit good toughness and rigidity.

Example 4

A formaldehyde-diketene copolymer is prepared as described in Example 3, except that in this example the liquid reaction mixture is cooled to −70° C. prior to the addition of the diketene and the catalyst. After addition of the catalyst, the reaction mixture is allowed to warm gradually in a time period of 3 hours to a temperature of +9° C. The reaction mixture is then maintained at 9° to 10° C. for an additional hour, making a total reaction time of 4 hours. The polymeric material recovered (53.5 g.) melts at approximately 145° C. Moldings prepared from this product, as described in Example 3, are of a rubbery, elastic character and are transparent and somewhat yellow in appearance.

Example 5

A one-liter, four-necked polymerization flask fitted as described in Example 1, is charged with 250 ml. of dry nitrobenzene at room temperature and 25 g. of trioxane is added and dissolved therein with agitation. The polymerization system is then sealed and purged with nitrogen, after which 5 ml. of diketene is injected into the polymerizer and thoroughly blended with the trioxane-nitrobenzene solution. While nitrogen purging is continued, 2 ml. of a one-molar solution of boron trifluoride diethyl etherate catalyst in benzene is injected into the polymerizer. While the reaction is continued, an additional 5 ml. of the catalyst solution is added to the polymerization mixture 1½ hours after the first catalyst addition; 10 additional ml. of catalyst solution is then added 2½ hours after the initial catalyst charge. After the final addition of catalyst, the reaction is continued for 3½ hours, being warmed in the last 15 minutes of the reaction period from a temperature of 30° to 138° C. The white polymeric material recovered, which melts at 170° C. is molded at 180° to 190° C. to prepare white, opaque specimen moldings which are extremely tough and rigid.

Example 6

Following the general procedure as outlined in Example 5, a trioxane-diketene copolymer is prepared employing in the initial reaction mixture, 250 ml. of nitrobenzene, 25 g. of trioxane, 5 ml. of diketene and, as catalyst, 7 ml. of the one-molar solution of boron trifluoride diethyl etherate in benezene. The temperature of the reaction mixture is 21° to 24° C. After the catalyst addition the reaction is continued for 75 minutes, after which 10 ml. of the catalyst solution is added to the reaction mixture. Four additional ml. of the catalyst solution is then added 2¾ hours after the initial catalyst charge. The reaction mixture is then slowly heated to a temperature of 50° C., at which temperature 2 ml. of diketene and 0.5 ml. of pyridine are injected into the mixture. The reaction is then continued for an additional 2½ hours, while further heating the reaction mixture to a final temperature of 68° C. After cooling the mixture, the product is isolated, purified and dried as described in the previous examples. The polymeric material recovered melts at approximately 180° C. and, with continued heating, shows substantial stability up to at least 250° C. The thermal stability of this product is determined by thermogravimetric analysis as follows, employing a Stanton Automatic Recording Thermobalance, High Temperature Model.

A prescribed quantity of the copolymer is heated in an inert atmosphere in an oven maintained at 220° C. At intervals during the heat exposure period, the weight loss or degradation of the copolymer is measured and recorded. After the heat exposure period, the logarithm of the weight percent of the remaining undegraded copolymer versus the corresponding times of oven exposure is plotted. A decomposition curve drawn through the plotted values indicates that the copolymer degrades initially at a very fast rate after which it degrades at a much slower, even rate through the major portion of the degradation period. This latter period characterizes the stable nature of the copolymer and the reaction rate constant for thermal degradation of the copolymer is selected from this latter portion of the degradation curve. This value is expressed as weight percent per minute. Using this procedure, the reaction rate constant for thermal degradation of the copolymer of this example at 220° C. is 0.1 weight percent per minute, 90 percent of the copolymer remaining stable after the initial decomposition has been completed.

Example 7

To illustrate the improved resistance to thermal degradation exhibited by the copolymers of this invention by comparison to unstabilized polyoxymethylene which is similarly prepared and tested, an oxymethylene homopolymer is prepared following the general procedure as outlined in Example 1 and employing 80 g. of trioxymethylene, 500 ml. of anhydrous n-heptane and 2 ml. of a one-molar solution of butyl lithium catalyst in n-heptane. The reaction is carried out for a period of 4½ hours, during which time period the reaction mixture, which is maintained initially at a temperature of −70° C., gradually warms to a temperature of −50° C. and is warmed further by gentle heating to a final temperature of +60° C. At the end of the reaction period, the polymeric product is isolated, purified and dried, and 10.4 g. of oxymethylene polymer is recovered. This polymer melts sharply at 186° C. When tested for thermal stability as described in Example 6, it exhibits a reaction rate constant for thermal degradation at 220° C. of 3.5 weight percent per minute, decomposing at a steady, rapid rate throughout the test period. The material is completely decomposed and disappears about 35 minutes after the test has started. When the polymer is molded at 190° C., as described in the previous examples, badly distorted dull pieces of opaque material are obtained. These pieces are brittle and appear somewhat porous in nature as if partially foamed by gaseous formaldehyde monomer evolved by decomposition of the polymer during heating.

It is to be understood that although the invention has been described with specific reference to particular embodiments thereof, it is not to be so limited, since changes and alterations therein may be made which are within the full intended scope of this invention as defined by the appended claims.

What is claimed is:

1. A normally solid, thermally-stable thermoplastic composition comprising essentially from about 80 up to 99.9 percent of recurring units derived from formaldehyde and from about 0.1 up to 20 percent of recurring units derived from diketene having at least one structure selected from the group consisting of

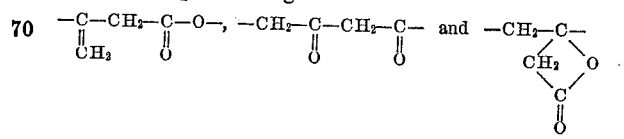

2. A process for preparing a copolymer composition of high thermal stability which comprises reacting under substantially anhydrous conditions and in the presence of an anionic-type polymerization catalyst consisting of an organic nitrogen compound, a mixture comprising, as the major constituent, formaldehyde, and as the minor constituent, diketene; and recovering a solid copolymer containing from about 80 up to 99.9 percent of recurring oxymethylene units and from about 0.1 up to 20 percent of recurring units derived from the said diketene.

3. The process of claim 2 in which the organic nitrogen compound is triethylamine.

4. A process for preparing a copolymer composition of high thermal stability which comprises reacting in an inert organic liquid reaction medium under substantially anhydrous conditions, at a temperature within the range of −80° to +90° C. and for a time period of 1 hour to 10 hours, a major amount of formaldehyde and a minor amount of diketene in the presence of from 0.01 to about 25 millimols per liter of reaction medium of an anionic-type polymerization catalyst consisting of an organic nitrogen compound; and recovering a solid copolymer containing from 80 up to 99.9 percent of recurring oxymethylene units and from about 0.1 up to about 20 percent of recurring units derived from diketene.

5. The process of claim 4 in which the reaction is conducted at a temperature ranging from −70° to +80° C. for a time period of 1 to 6 hours.

6. The process of claim 4 in which the organic liquid reaction medium is selected from the group consisting of aliphatic and chlorinated aliphatic hydrocarbons, aromatic and nitrated aromatic hydrocarbons.

References Cited

UNITED STATES PATENTS 3,026,299  3/1962  Kray et al. _____ 260—67

FOREIGN PATENTS 1,323,189  7/1963  France.
1,353,226  1/1964  France.
1,271,297  7/1961  France.

OTHER REFERENCES

Furukawa et al.: Die Makromolekulare Chemie, vol. 39(3).

Oda et al.: Ibid, vol. 43(½).

Kern et al.: Angewandte Chemie, vol. 73(6), 1961.

WILLIAM H. SHORT, *Primary Examiner.*

L. M. PHYNES, *Assistant Examiner.*